US011103802B2

(12) United States Patent
Jellema et al.

(10) Patent No.: US 11,103,802 B2
(45) Date of Patent: Aug. 31, 2021

(54) APPARATUS FOR DESUBLIMING OR CONDENSING A CONDENSABLE FLUID IN A CLOSED SPACE (71) Applicant: SOLUTHERM B.V., Oss (NL)

(72) Inventors: Pieter Jellema, Oss (NL); Jelle Luutzen Nijdam, Oss (NL)

(73) Assignee: Solutherm B.V., Oss (NL)

( * ) Notice: Subject to any disclaimer, the term of this patent is extended or adjusted under 35 U.S.C. 154(b) by 987 days.

(21) Appl. No.: 15/116,969

(22) PCT Filed: Feb. 6, 2015

(86) PCT No.: PCT/NL2015/050079
§ 371 (c)(1),
(2) Date: Aug. 5, 2016

(87) PCT Pub. No.: WO2015/119501
PCT Pub. Date: Aug. 13, 2015

(65) Prior Publication Data
US 2017/0165588 A1  Jun. 15, 2017

(30) Foreign Application Priority Data
Feb. 6, 2014  (NL) ................................ NL 2012221

(51) Int. Cl.
*B01D 1/06* (2006.01)
*B01D 5/00* (2006.01)
(Continued)

(52) U.S. Cl.
CPC ............ *B01D 1/065* (2013.01); *B01D 5/006* (2013.01); *B01D 5/0012* (2013.01); *C11B 3/001* (2013.01);
(Continued)

(58) Field of Classification Search
None
See application file for complete search history.

(56) References Cited

U.S. PATENT DOCUMENTS 4,431,049 A * 2/1984 Zamma ................... F22B 1/021
165/142
4,601,790 A 7/1986 Stage
(Continued)

FOREIGN PATENT DOCUMENTS

DE      33 23 120 A1    6/1983
DE    196 04 747 A1    2/1996
(Continued)

OTHER PUBLICATIONS

Kassat, "Machine Translation of DE19604747", published 1997, 42 total pages. (Year: 1997).*

*Primary Examiner* — Jonathan M Peo
(74) *Attorney, Agent, or Firm* — The Dobrusin Law Firm, PC (57) ABSTRACT The invention relates to an apparatus for desubliming, condensing or evaporating a fluid. The apparatus includes a chamber and at least one tubular member for desubliming, condensing or evaporating the fluid on the outer surface of the at least one tubular member. The chamber is provided with at least one inlet for the fluid and at least one outlet for the condensate and/or evaporate, and at least one supply and at least one discharge for a cooling and/or heating fluid. The tubular member includes an outer member and an inner member enclosed within the outer member. The inner member is in communication with the supply at a first end. The outer member is in communication with the discharge at a first end. The outer member is closed at a second end. The inner member is open and mouths into the outer member at a second end.

9 Claims, 6 Drawing Sheets (51) Int. Cl.
*F28D 7/12* (2006.01)
*F28D 7/16* (2006.01)
*C11B 3/00* (2006.01)
*F28B 1/02* (2006.01)
*F28F 9/22* (2006.01)
*F28D 21/00* (2006.01)

(52) U.S. Cl.
CPC .................. *F28B 1/02* (2013.01); *F28D 7/12* (2013.01); *F28D 7/16* (2013.01); *F28F 9/22* (2013.01); *F28D 2021/0061* (2013.01); *F28D 2021/0063* (2013.01); *F28D 2021/0064* (2013.01); *F28F 2009/226* (2013.01)

(56) References Cited

U.S. PATENT DOCUMENTS

| | | | | |
|---|---|---|---|---|
| 4,889,182 A | * | 12/1989 | Kosters | F28D 7/12 165/134.1 |
| 6,658,851 B2 | * | 12/2003 | Jellema | B01D 5/0012 60/687 |
| 8,069,678 B1 | * | 12/2011 | Bernert | F28F 9/0282 62/50.2 |
| 2003/0097842 A1 | | 5/2003 | Jellema | |

FOREIGN PATENT DOCUMENTS

| | | |
|---|---|---|
| DE | 196 04 747 | 8/1997 |
| DE | 101 39 967 A1 | 8/2001 |
| DE | 101 39 967 | 3/2003 |
| GB | 2 096 759 | 10/1982 |
| WO | 02/32535 A1 | 4/2002 |

* cited by examiner

APPARATUS FOR DESUBLIMING OR CONDENSING A CONDENSABLE FLUID IN A CLOSED SPACE

INCORPORATION BY REFERENCE

The disclosure of PCT/NL2015/050079 filed on Feb. 6, 2015, now WO 2015/119501 A1, which claims priority to NL Patent Application No. NL-2012221 filed on Feb. 6, 2014 including the specification, drawings and abstract are both incorporated herein by reference in its entirety.

TECHNICAL FIELD

The invention relates to an apparatus for desubliming or condensing a condensable fluid, which apparatus is provided with a chamber and at least one tubular member within the chamber, said at least one tubular member extending in an upright direction, for desubliming or condensing a condensable fluid on the surface of the at least one tubular member.

BACKGROUND

Such an apparatus, as is known from DE-A1-34 41 074, can be used in a method for refining oil or fat, wherein during a deodorization process, fatty acids, coloured and/or malodorous components and/or other volatile substances are removed from an oil or fat. This is done, for instance, by contacting the oil or fat to be deodorized, with steam of a temperature in the range of 200 to 260° C., the so-called strip steam. The strip steam is introduced at the bottom of a deodorizer vessel in which the oil or fat to be deodorized flows from top to bottom. Inside the deodorizer vessel, appropriate means induce a good contact between the oil or fat and the strip steam. Consequently, the strip steam dissolves fatty acids, coloured and/or malodorous components and other volatile substances from the oil or fat. Accordingly after deodorization, stable, refined, colourless, tasteless and odourless oil is obtained.

The deodorization process requires reduced pressures preferably of less than 10 mbar. To be able to maintain such reduced pressure in the deodorizer vessel, the strip steam with the impurities dissolved therein must be evacuated from the deodorizer vessel through a duct connected to a vacuum unit. In order to reduce the load on the vacuum unit, it is advantageous to condense the strip steam containing the impurities dissolved therein. This is realised by supplying the evacuated strip steam containing the impurities dissolved therein to an apparatus containing tubes cooled with a cooling fluid, for instance liquid ammonia. The evacuated strip steam containing the impurities dissolved therein desublimes or condenses on the surface of those cooled tubes, so that a desublimate or condensate such as an ice layer, containing all the impurities removed from the deodorized oil or fat is formed on the surface of the tubes. This process is sometimes designated as "dry condensing" or "ice condensing".

During the deodorization process, the ice layer forming on the surface of the tubes accumulates and therefore such ice layer must be removed from time to time. Moreover, as the ice layer covering the surface of the tubes is insulating, the energy consumption to cool said tubes increases as the ice layer becomes thicker. Frequent defrosting is therefore necessary to keep the efficiency of the process high and energy consumption low. Frequent defrosting, however, means frequent interruption of the deodorization process. This means not only that costly production time is lost, but also that frequent heating up and cooling down is required, which means, in addition to a considerable energy consumption, that the equipment is frequently exposed to high shrinkage and expansion forces and hence must be of substantially heavy construction, so that the energy consumption for heating up and cooling down increases even further. Also, a heavy and complicated equipment designed to withstand frequent high shrinkage and expansion forces increases considerably the construction price of this equipment. A dramatic consequence of equipment subjected to frequent high shrinkage and expansion forces is that leakage of the cooling fluid may occur. Besides the long production disruption that such leakage occurrence induces, the environmental consequences are far worse when the cooling fluid which is often liquid ammonia is released to the atmosphere. This has caused fatalities in the past.

Frequent defrosting can be reduced by using a so-called wet condensing process. In such process, as known, for instance, from U.S. Pat. No. 3,589,104 A, during condensing or desubliming of the condensable fluid, a liquid film of a temperature approximately equal to that of the cooling fluid is passed over the tubes. The condensable fluid then condenses or desublimes on the liquid film, without this involving freezing on, because the condensed or desublimed condensable fluid is continuously discharged via the liquid film. Thus, defrosting is not necessary, or at least much less frequently so, but this does not mean that the problems inherent to high shrinking and expansion forces in starting up and switching off the apparatus have thus been remedied.

WO02/32535A1 discloses an apparatus which at start-up and switch-off is no longer subject to high shrinking and expansion forces, and thus can be made of considerably lighter and cheaper construction and design, and can be operated with a lower energy consumption.

However, for the equipment and processes described above, in case of leakage of the cooling tubes, the cooling fluid is still released to the atmosphere which is highly damageable and should be avoided.

OBJECT OF THE INVENTION

It is an object of the invention to further improve the apparatus for desubliming or condensing a condensable fluid. It is also an object of the invention to provide an apparatus for desubliming or condensing a condensable fluid that prevents the release of cooling fluid to the atmosphere in case of leakage of the cooling fluid supply.

SUMMARY OF THE INVENTION

The invention relates to a method for desubliming or condensing a condensable fluid. More specifically, the invention relates to a method for desubliming of condensing a strip steam. The strip steam can originate from a device for refining an oil, such as an edible oil.

The method is performed in an apparatus provided with a chamber and at least one tubular member extending in an upright direction within the chamber and having a falling film of cooling fluid on an inner side thereof. The method includes providing the tubular member with an outer member and an inner member extending within the outer member, wherein the inner member at a lower end thereof is in communication with a supply of cooling fluid and the outer member at a lower end thereof is in communication with a discharge for the cooling fluid, wherein the outer member at an upper end thereof is closed, and the inner member at an upper end thereof is open and mouths into the outer member.

The method further includes supplying the cooling fluid through the inner member so as to provide the falling film of cooling fluid on the inner side of the outer member. The condensable fluid is provided to the chamber and desublimes or condensates upon contact with the outer surface of the at least one tubular member. Such apparatus and the associated advantages are described below in more detail.

The method can include wet condensing or dry condensing. In wet condensing the strip steam condenses, or desublimes, on a flim of liquid flowing down on the outer surface of the at least one tubular member. In dry condensing the strip steam condenses, or desublimes, on the outer surface of the at least one tubular member to which no liquid is provided, except for the condensate. Dry condensing may require periodic removal of ice from the at least one tubular member. Therefore, in dry condensing the process of desubliming or condensing the strip steam is stopped from time to time for thawing ice on the outer surface of the at least one tubular member by supplying the warm or hot fluid to the ice. Therefore the method of dry condensing may include repetitively performing the steps of condensing or desubliming the strip steam; heating the at least one tubular member; and cooling down the at least one tubular member. These steps can be performed in a continuing cycle.

Optionally, the step of cooling down includes cooling down the at least one tubular member from a higher temperature to a working temperature, by providing a two phase mixture, e.g. including a gasesous phase and a liquid phase, of the cooling fluid to the at least one tubular member. It has been found that the two phase mixture provides more efficient cooling of the warm at least one cooling member. Also, using the two phase cooling fluid allows the use of a cooling system of lower capacity than when merely liquid cooling fluid were used for cooling down.

Optionally, the liquid phase of the two phase mixture of the cooling fluid is made to evaporate downstream of the second end of the inner member.

Optionally, during the step of condensing or desubliming the cooling fluid is provided to the at least one tubular member as a one phase liquid; and during the step of cooling down the two phase mixture of the cooling fluid is provided to the at least one tubular member. This provides the advantage that during the cooling down of the warm at least one tubular member optimal cooling is achieved with the two phase mixture, while during condensing or desubliming the at least on tubular member is maintained cooled using the liquid cooling fluid. Hence, optimal use is made of the cooling system. Hence the cooling system can be dimensioned for smaller capacity than when cooling down was also effected with liquid cooling fluid.

Optionally, a flow speed of the two phase mixture of the cooling fluid between the supply and the second end of the inner member is maintained at a high level, e.g. of at least 10 m/s, preferably at least 15 m/s, more preferably at least 20 m/s. Optionally, during the step of condensing or desubliming the cooling fluid is provided to the at least one tubular member at a lower flow speed than during the step of cooling down.

Optionally, the cooling down is effected by intermittently providing the two phase mixture to the at least one tubular member. Optionally, the cooling down includes alternately during a first period providing the two phase mixture to the at least one tubular member and during a second period not providing a cooling fluid to the at least one tubular member, wherein a duration of such second period is longer than the duration of such first period, such as three to ten times longer. This provides that the liquid phase of the two phase mixture can efficiently expand in and cool the at least one tubular member.

Optionally, the step of heating the at least one tubular member includes supplying a warm or hot fluid, such as hot water, to an outer surface of the at least one tubular member. Optionally, the warm or hot fluid is supplied via a distribution element arranged at or above the upper end of the at least one outer member.

It has surprisingly been found that the object of the invention is provided with an apparatus for desubliming or condensing a condensable fluid, which apparatus includes a chamber and at least one tubular member within the chamber, said at least one tubular member extending in an upright direction, for desubliming or condensing the condensable fluid on the outer surface of the at least one tubular member for forming a desublimate or condensate of the condensable fluid.

The chamber is provided with at least one inlet for the condensable fluid and at least one outlet for the condensate. The chamber is further provided with at least one supply and at least one discharge for a cooling fluid. The tubular member includes an outer member, extending in the upright direction, and an inner member, also extending in the upright direction. The inner member is enclosed within the outer member. The inner member, at a lower end thereof, is in communication with the supply for cooling fluid. The outer member, at a lower end thereof, is in communication with the discharge for cooling fluid. The outer member, at an upper end thereof, is closed. The inner member, at an upper end thereof, is open and mouths into the outer member.

This provides the advantage that the cooling fluid can be supplied to the tubular member from below. Hence, the supply of cooling fluid is not located in the area where the to-be-condensed fluid is present. Thus, even in case of a leak in the cooling fluid supply, contamination of condensable fluid can be avoided. By no longer supplying the tubular member with cooling fluid from above, the flow of the condensable fluid is no longer obstructed near the upper end of the at least one tubular member, thus increasing efficiency of the apparatus. Also, in this way the building height of the apparatus can be reduced. Further, the apparatus is rendered less complex.

It will be appreciated that the condensable fluid can be a water-containing fluid. In such case the condensate can be water or ice.

Optionally, the apparatus includes a cooling system arranged for supplying a two phase mixture of the heating and/or cooling fluid to the at least one tubular member. As described above this allows for efficient cooling down of the at least one tubular member.

Optionally, the apparatus includes a restriction for generating the two phase mixture at or near the supply. Hence the two-phase mixture is generated near the supply, e.g. from a superheated cooling fluid.

Optionally, the cooling system (102) is arranged for during the step of condensing or desubliming providing the cooling fluid to the at least one tubular member as a one phase liquid; and during the step of cooling down providing the two phase mixture of the cooling fluid to the at least one tubular member.

Optionally, the cooling system (102) is arranged for during the step of condensing or desubliming providing the cooling fluid to the at least one tubular member at a lower flow speed than during the step of cooling down.

Optionally, the at least one tubular member is arranged for effecting evaporation of the liquid phase of the two phase mixture at, or downstream of, the second end of the inner member. Thereto, at the end of the inner member sudden expansion of the two phase mixture may be effected. Therefore, an inner diameter of the outer member is preferably chosen at least 3 times larger, preferably at least 5 times larger, such as 5-10 times larger, e.g. approximately 8 times larger, than an inner diameter of the inner member.

Optionally, the at least one tubular member is arranged for maintaining a high flow speed of the two phase mixture between the supply and the second end of the inner member. Thereto the inner diameter of the inner member, may be chosen between 4-10 mm, e.g. 6 mm. Optionally the inner diameter of piping from the supply, e.g. from a restriction, such as a valve, at which the two phase mixture is generated, to the second end of the inner member is chosen between 4-10 mm, e.g. 6 mm.

The inventors realized that the apparatus according to the invention, as described above, can also be used for evaporating an evaporable liquid. Then, the apparatus is provided with a chamber and at least one tubular member, in use, extending in an upright direction within the chamber, for evaporating the liquid on the outer surface of the at least one tubular member for forming an evaporate of the evaporable liquid. The chamber is provided with at least one inlet for the liquid and at least one outlet for the evaporate. The chamber is further provided with at least one supply and at least one discharge for a heating fluid. The tubular member includes an outer member, extending in the upright direction, and an inner member, also extending in the upright direction. The inner member is enclosed within the outer member. The inner member, at a lower end thereof, is in communication with the supply. The outer member, at a lower end thereof, is in communication with the discharge. The outer member, at an upper end thereof, is closed. The inner member, at an upper end thereof, is open and mouths into the outer member.

Hence, the heating fluid can be supplied to the tubular member from below. Hence, the supply of heating fluid is not positioned in the area where the to-be-evaporated liquid is present. Thus, even in case of a leak in the heating fluid supply, contamination of the to-be-evaporated liquid can be avoided. By no longer supplying the tubular member with heating fluid from above, the flow of the to-be-evaporated liquid is no longer obstructed near the upper end of the at least one tubular member, thus increasing the efficiency of the apparatus. Also, in this way the building height of the apparatus can be reduced. Further, the apparatus is rendered less complex.

More in general, according to the invention is provided an apparatus for desubliming, condensing or evaporating a fluid, which apparatus is provided with a chamber and at least one tubular member, extending in an upright direction within the chamber, for desubliming, condensing or evaporating the fluid on the outer surface of the at least one tubular member. The chamber is provided with at least one inlet for the fluid and at least one outlet for the condensate and/or evaporate. The chamber is further provided with at least one supply and at least one discharge for a heating and/or cooling fluid. The tubular member includes an outer member, extending in the upright direction, and an inner member, also extending in the upright direction. The inner member is enclosed within the outer member. The inner member, at a first end thereof, is in communication with the supply. The outer member, at a first end thereof, is in communication with the discharge. The outer member, at a second end thereof, is closed. The inner member, at a second end thereof, is open and mouths into the outer member.

Optionally, the first end of the inner member is a lower end of the inner member, the first end of the outer member is a lower end of the outer member, a second end of the inner member is an upper end of the inner member, and a second end of the outer member is an upper end of the outer member. It will be appreciated that it is also possible that the tubular members are arranged in the upside-down orientation, i.e. the first end of the inner member being an upper end of the inner member, the first end of the outer member being an upper end of the outer member, a second end of the inner member being a lower end of the inner member, and a second end of the outer member being a lower end of the outer member. It is also possible that the apparatus is arranged in an upside-down orientation.

Optionally, the inner member is enclosed within the outer member along substantially the entire length of the outer member. Hence, substantially the entire length of the outer member contributes in desubliming, condensing or evaporating of the fluid.

Optionally, the outer member at the lower end thereof extends through a wall of the chamber and is sealingly secured therein. Thus the discharge for the heating and/or cooling fluid is sealed from the interior of the chamber in a simple manner.

Optionally, the second end of the outer member is a free end, such that the at least one tubular member can freely expand and shrink. This provides the advantage that shrinkage and expansion forces of the tubular member are not acting on the chamber. Thus, the apparatus can be made of considerably lighter and cheaper construction. Even if the outer member is sealingly secured to the wall, the tubular member can still freely expand and shrink relative to the wall of the chamber.

Optionally, the free end of the at least one outer member is guided, so as to be slidable in the longitudinal direction of the outer member. Hence the expanding and shrinking of the at least one tubular member in the longitudinal direction is accommodated, while movement of the tubular member in directions orthogonal to the longitudinal direction can be prevented, or at least diminished. This improves stability of the at least one tubular member within the apparatus. Optionally, the apparatus includes guide means which are located at a distance from the wall in which the outer member is sealingly secured.

Optionally, the free end of the at least one outer member comprises a guiding pin extending in the longitudinal direction of the outer member, and the chamber comprises a guide block for slidingly receiving the guiding pin. This provides a simple and effective means of maintaining the tubular member in the upright direction.

Optionally, the second end of the at least one outer member terminates within the chamber at a distance from a second end wall of the chamber, wherein the at least one inlet is arranged in the second wall. The second wall can be opposite to the wall in which the outer member is sealingly secured. By providing this distance, the free expansion of the at least one tubular member can be accommodated.

Optionally, both the outer member and the inner member are tubular. The tubular member can include at least one spacer for maintaining positioning of the inner member with respect to the outer member in a direction orthogonal to the longitudinal direction. The at least one spacer can e.g. be arranged for maintaining the inner member substantially in the middle of said outer member.

Optionally, the at least one spacer is slidably mounted, such that the inner member and outer member can freely expand and shrink relative to each other. The at least one spacer can be arranged to maintain the inner member coaxially within the outer member. Optionally the spacer maintains the inner member off-axis within the outer member.

Optionally, at or above the upper end of the at least one outer member a distribution element is arranged, with which a liquid film can be provided on the outer surface of the at least one tubular member. By providing on the outer surface of the tubular member a liquid film running downwardly along the outer surface of the tubular member, the wet-condensing process can be performed. Preferably, the liquid film has a temperature approximately equal to that of the fluid passed through the inside of the tubular member. Also, by providing the liquid film running downwardly along the outer surface of the tubular member the evaporation of the liquid film can efficiently be performed.

Optionally, the chamber is equipped with a plurality of tubular members each of them extending in the upright direction. This increases the capacity of the apparatus.

Optionally, at least at one level between the second ends and the first ends of the outer members a baffle plate is arranged over a part of the passage of the chamber, which baffle plate is provided with a passage for at least one outer member which passage does not disturb an outer surface of the outer member. The baffle plate stalls flow of the to-be-condensed fluid so as to improve efficiency of the apparatus. Sufficient clearance is allowed between the baffle plates and the outer surface of the outer member to ensure that a film of liquid can flow downwardly along the outer surface of said outer member substantially undisturbedly. It will be appreciated that the baffle may be supported against the outer surface of the outer member while hardly disturbing the film of liquid which can flow downwardly along the outer surface.

Optionally, all outer tubes of the plurality of tubular members terminate at their first ends in a collecting element. Optionally all inner tubes of the plurality of tubular members terminate at their first ends in a collecting element.

The invention also relates to a method for deodorating or refining an oil, including removing fatty acids, coloured and/or malodorous components and/or other volatile substances from the oil by stripping said oil with strip steam. The method includes desubliming or condensing the strip steam in an apparatus provided with a chamber and at least one tubular member extending in an upright direction within the chamber and having a falling film of cooling fluid on an inner side thereof. The method includes, providing the tubular member with an outer member and an inner member extending within the outer member, wherein the inner member at a first end thereof is in communication with a supply of cooling fluid and the outer member at a first end thereof is in communication with a discharge for the cooling fluid, wherein the outer member at a second end thereof is closed, and the inner member at a second end thereof is open and mouths into the outer member. The method further includes supplying the cooling fluid through the inner member so as to provide the falling film of cooling fluid on the inner side of the outer member. It will be appreciated that further aspects of the method and apparatus described above also apply to this method.

Likewise, the invention also relates to a method for evaporating a fluid, in an apparatus provided with a chamber and at least one tubular member extending in an upright direction within the chamber and having a falling film of heating fluid on an inner side thereof. The method includes providing the tubular member with an outer member and an inner member extending within the outer member, wherein the inner member at a first end thereof is in communication with a supply of heating fluid and the outer member at a first end thereof is in communication with a discharge for the heating fluid, wherein the outer member at a second end thereof is closed, and the inner member at a second end thereof is open and mouths into the outer member. The method further includes supplying the heating fluid through the inner member so as to provide the falling film of heating fluid on the inner side of the outer member. The fluid is provided to the chamber and evaporates upon contact with the outer surface of the at least one tubular member.

BRIEF DESCRIPTION OF THE DRAWINGS

The invention will now be further described referring to the drawing in which.

DETAILED DESCRIPTION

Figure 1:
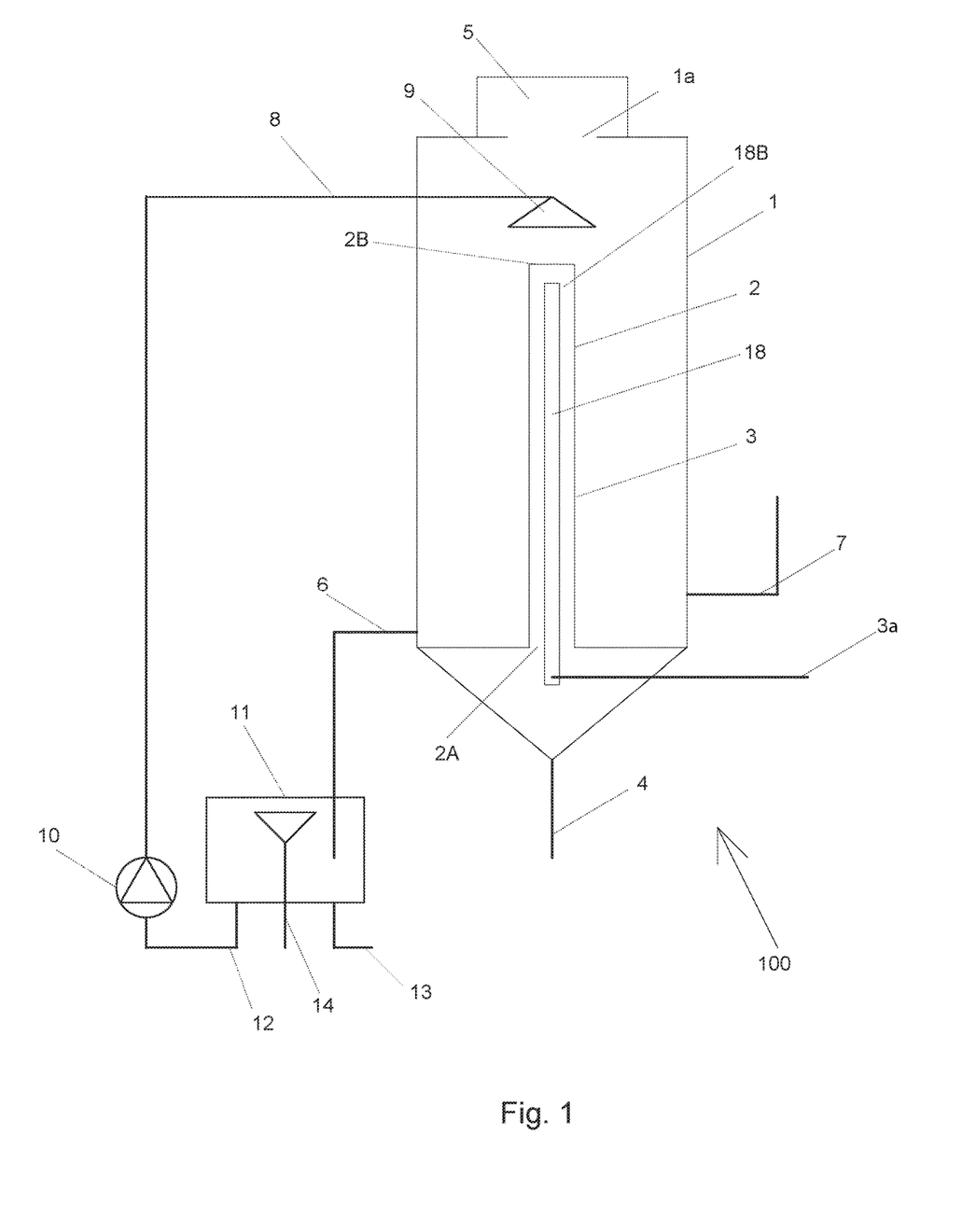
FIG. 1 shows a schematic view of an apparatus according to the invention.

FIG. 1 shows a schematic representation of an apparatus 100 according to the invention. The apparatus 100 includes a chamber 1. In this example, the chamber 1 is embodied as a vessel, for instance of stainless, steel. The apparatus further includes at least one tubular member 3. In this example, the tubular member 3, extends in an upright direction within the chamber 1 while the apparatus 100 is in a position ready for use. Even if it is common sense that "upright direction" means the "vertical direction", it will be appreciated that a deviation from a strictly vertical direction can be allowed. It is for instance possible that the tubular member 3 deviates from the vertical direction by between 0 and 45 degrees, preferably by less than 15 degrees.

The tubular member 3 includes an outer member 2 and an inner member 18. In this example, the inner member 18 and the outer member 2 are tubular. The inner member can for instance have a circular or polygonal, such as square or triangular, cross section. Also the outer member can for instance have a circular or polygonal, such as square or triangular, cross section. In this example, the inner member 18 and the outer member 2 extend in the upright direction. The inner member 18 is enclosed within the outer member 2.

The apparatus 100 includes at least one supply 3a and at least one discharge 4 for a cooling and/or heating fluid. The inner member 18 is in communication with the supply 3a at a lower end 18A of the inner member 18. The outer member 2 is in communication with the discharge 4 at a lower end 2A of the outer member 2. The outer member 2 is closed at an upper end 2B of the outer member 2. The inner member 18 is open at an upper end of the inner member 18. The inner member 18 mouths into the outer member 2. In this example, the inner member 18 is enclosed within the outer member 2 along substantially the entire length of the outer member 2. Thus, the inner member 18 mouths into the outer member near the closed upper end 2B of the outer member 2.

The apparatus 100 further includes an inlet 1*a* for feeding a fluid to be condensed into the chamber 1. The apparatus 100 further includes an outlet 6 for allowing the condensate to be drained from the chamber 1.

The apparatus 100 can for example be used for condensing or desubliming a so-called strip steam. Such a strip steam originates, for instance, from a device for refining oil, such as edible oil, or fat, such as cocoa butter. The quality of refined oil is determined to a considerable extent by the so-called deodorization process, whereby fatty acids, coloured and/or malodorous components and/or other volatile substances are removed from the oil by stripping said oil with strip steam. During such stripping the chamber can be maintained at an absolute pressure of at most 3 to 4 mbar, preferably 1.5 to 2 mbar, possibly 0.5 to 1 mbar.

The strip steam loaded with impurities coming from the deodorization process must be desublimed or condensed. Desubliming or condensing takes place in the chamber 1 which then functions as a heat exchanger. To that end the tubular member 3 is cooled internally. The internal cooling of the tubular member 3 in this example takes place with the aid of a cooling fluid, for instance liquid ammonia, of a temperature of −28° C., supplied through a supply 3*a* and discharged via a discharge 4.

Further, the chamber 1 is provided with an inlet 1*a* for bringing the strip steam into the chamber, and an outlet 6 for the condensed strip steam (condensate) or desublimed strip steam (desublimate). A further outlet 7 is present for gases that remain volatile. To enable working according to the wet condensing process, a further inlet 8 is present for supplying a liquid. This liquid, by means of a distribution element 9, can be provided as a liquid film on the outer surface of the tubular member 3, while the liquid forming the film is discharged, together with the desublimed or condensed strip steam, via the outlet 6.

The outlet 6 is connected with a tank 11, which is provided with a discharge 12, which is connected through a pump 10 with the inlet 8. The tank 11 is further provided with a discharge 13 and a discharge 14.

Figure 2:
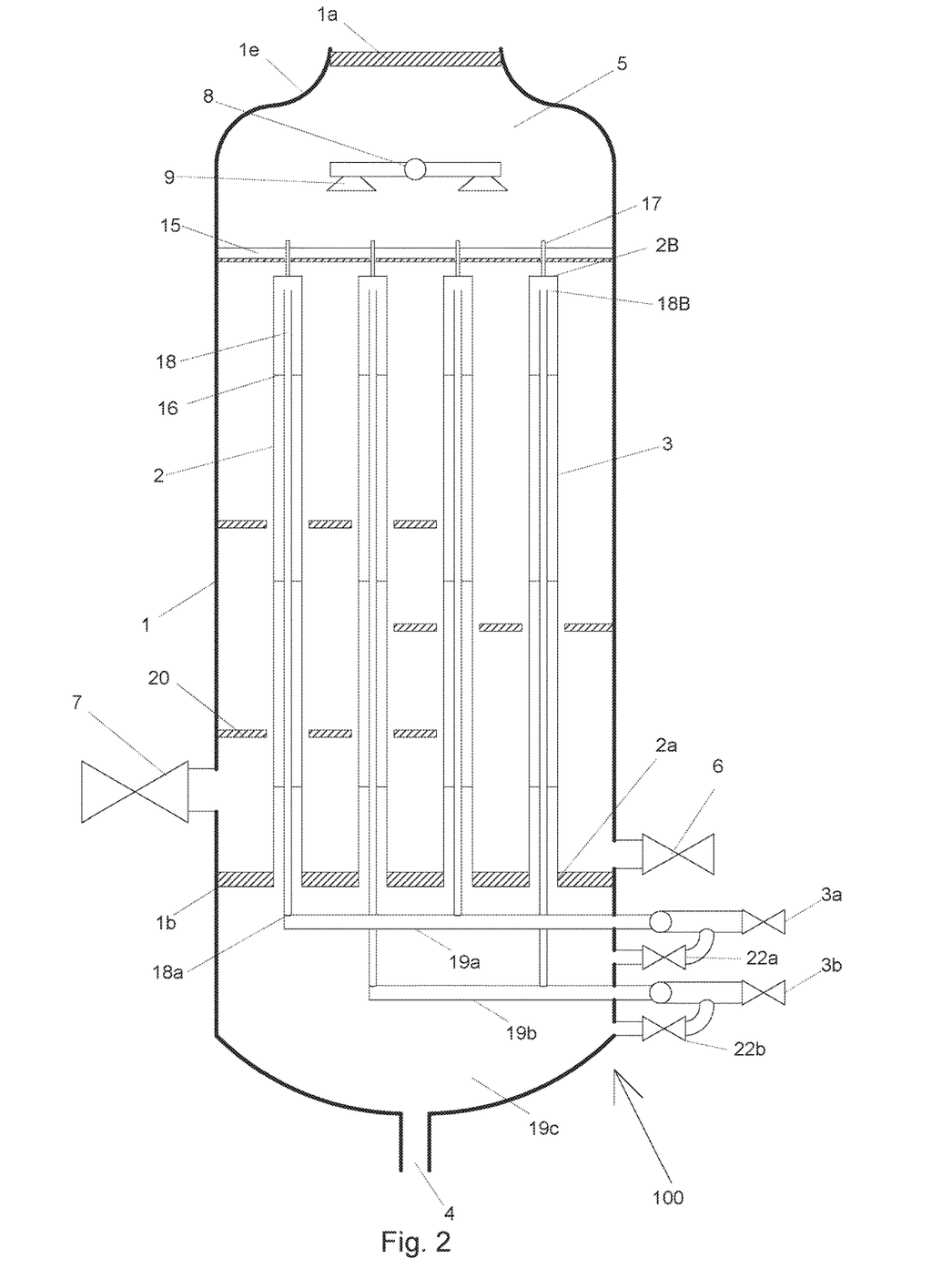
FIG. 2 shows a sectional side view of an apparatus according to the invention.
Figure 3:
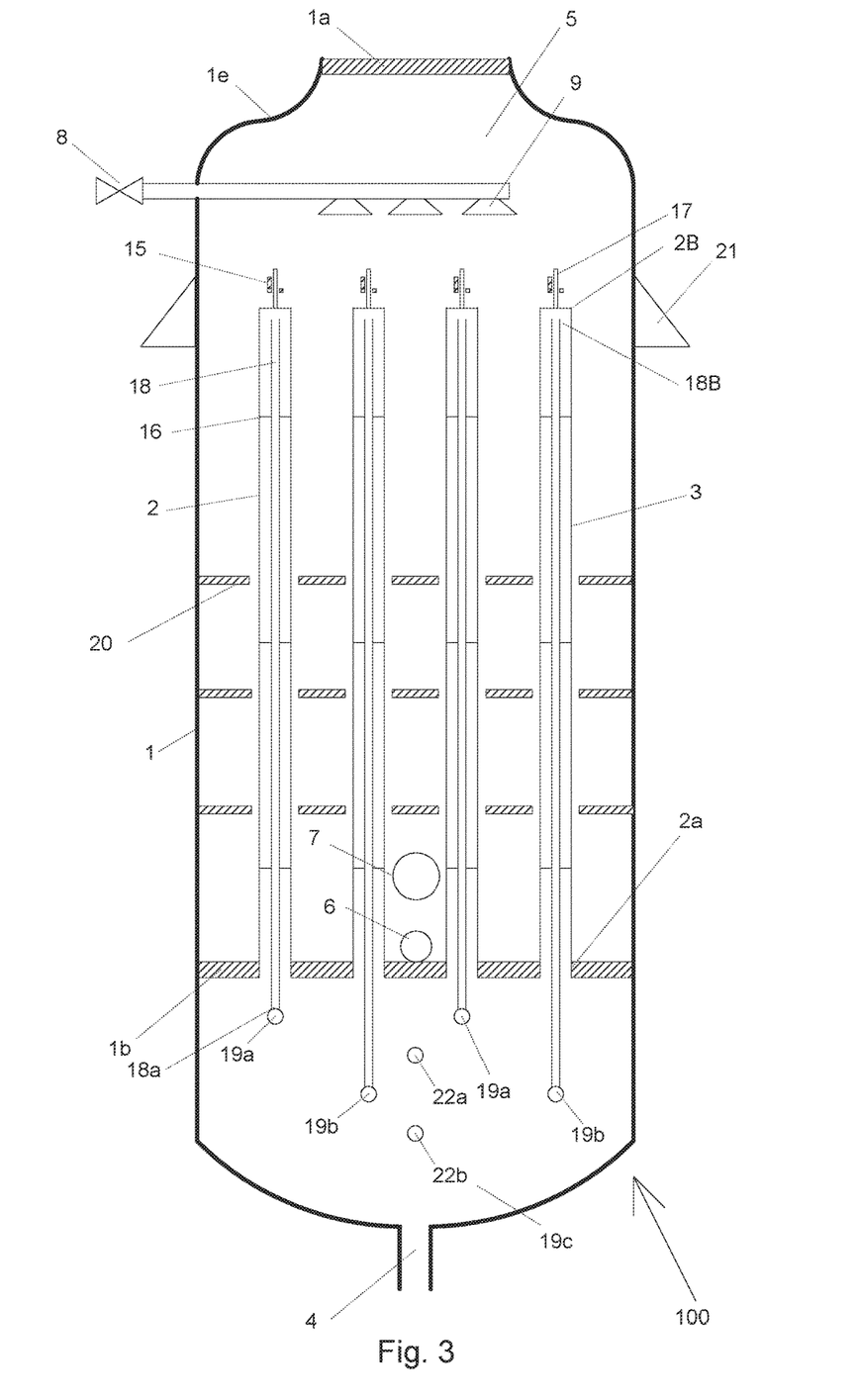
FIG. 3 shows a sectional side view of the apparatus shown in FIG. 2.

FIGS. 2 and 3 show sectional views of the apparatus 100 according to the invention. The chamber 1 is formed by for example a tubular vessel, arranged upright, having at the top the inlet 1*a*. The chamber 1 is closed at the bottom by a tube plate 1*b* through which extend the tubular members 3. The outer members 2 have been sealingly secured in the tube plate 1*b* and extend in the chamber 1 over a part of the height thereof. The tubular members 3 terminate, at a distance from the top of the chamber, in a free end 2B which is closed off relative to the interior of the chamber. Adjacent to that free end, the tubular members 3 are held in position by guide means allowing longitudinal sliding of the tubular members. The free ends 2B of the outer members 2 each comprise a guiding pin 17 extending in the longitudinal direction of the outer member. The chamber 1 comprises a guide block 15 for slidingly receiving the guiding pins 17.

The tubular member 3 in FIGS. 2 and 3 includes one or more spacers 16. The spacer 16 is arranged for maintaining positioning of the inner member 18 with respect to the outer member 2 in a direction orthogonal to the longitudinal direction.

Figure 4:
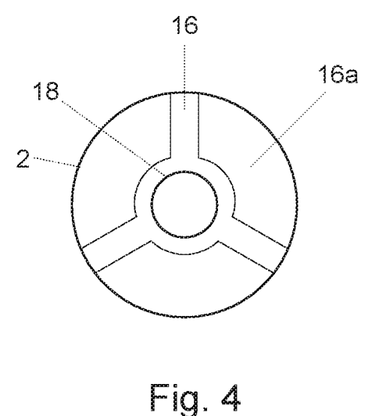
FIG. 4 shows a cross sectional view of a tubular member.

FIG. 4 shows a top plan view of an example of a spacer 16. In this example, the inner 18 and outer member 2 have a circular cross section and the spacer 16 maintains the inner member 18 coaxially in the centre of the outer member 2. The spacer 16 is arranged to allow movement of the inner member 18 relative to the outer member 2 in a longitudinal direction, to minimize thermal stresses. The spacer 16 can for instance allow sliding of the inner member relatively to the outer member. The spacer 16 includes passages 16*a* for allowing the cooling fluid to pass.

In the FIGS. 2 and 3 the chamber 1 has been given a kind of bottle shape by situating the inlet 1*a* at the top. From the viewpoint of manufacturing technique, it may be preferable to make the chamber of tubular design and to close it with a disc-shaped end plate and to design the inlet in the form of a lateral connecting stub. This does not change the operation of the apparatus.

In the FIGS. 2 and 3, in the chamber 1, at different levels, baffles 20 are arranged, which extend between the tubular members 3. The baffles 20 surround the tubular members 3 in spaced relation therefrom.

In FIGS. 2 and 3 the lower ends 18A of the inner members 18 are connected to the supplies 3*a*, 3*b* via piping 19*a*, 19*b*. In FIGS. 2 and 3 the lower ends 2A of the outer members 2 are connected to the discharge 4 via a collecting chamber 19*c*. It is noted that bypass valves 22*a*, 22*b* can be positioned between the supplies 3*a*, 3*b* and the discharge 4 to allow for draining of the cooling fluid from the tubular members, e.g. for cleaning or maintenance.

Figure 5:
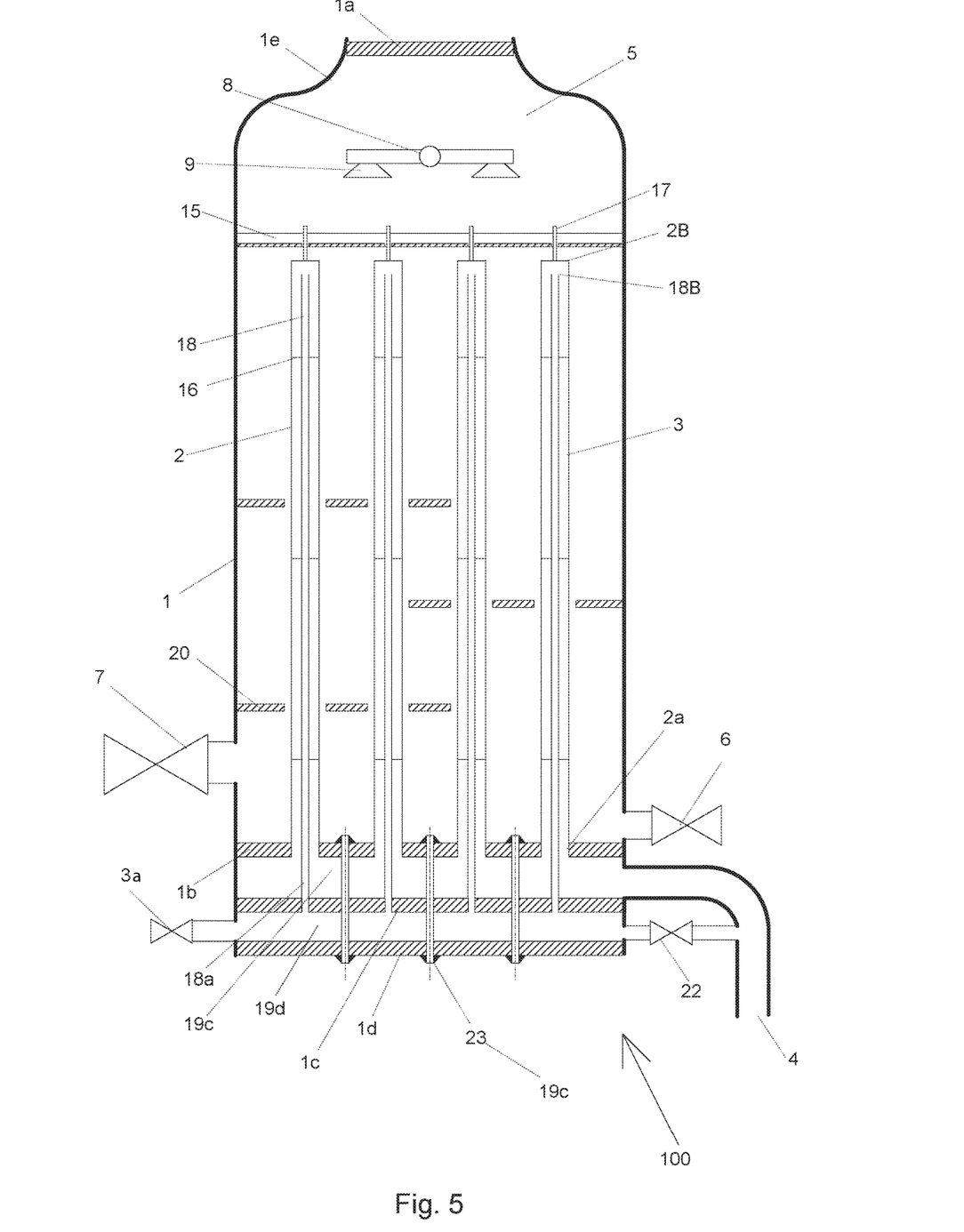
FIG. 5 shows a sectional side view of an apparatus according to the invention.

FIG. 5 shows an alternative embodiment of the apparatus 100 according to the invention. In this example, the lower ends 2A of the outer members 2 have been sealingly secured in the tube plate 1*b*. The lower ends 2A of the outer members 2 are connected to the discharge 4 via the collecting chamber 19*c*. In this example, the lower ends 18A of the inner members 18 have been sealingly secured in a divider plate 1*c*. The lower ends 18A of the inner members 18 are connected to the supply 3*a* via a second collecting chamber 19*d*. The second collecting chamber 19*d* is closed at its lower end by a bottom plate 1*d*. In FIG. 5 are further shown a number of reinforcements 23. The reinforcements 23 prevent buckling of the plates 1*b*, 1*c*, 1*d* due to pressure of the cooling fluid. The pressure of the cooling fluid can rise to values of for example 17 bar.

The apparatus 100 described with respect to FIGS. 1-5 can be operated as in the following example.

The chamber 1 is brought to the desired pressure and temperature by any suitable means (not shown). A difference in shrinkage upon cooling between the chamber 1 and the tubular members 3 present in the chamber 1 and secured on one side in the chamber 1 will be taken up by displacement of the tubular members relative to the guide block 15 connected with the chamber 1. Thus, the chamber 1, which can be held in its upright position by its resting through supports 21 on a frame (not shown), can be made of relatively light construction, since it is hardly, if at all, subject to shrinkage and expansion stresses.

Before starting the desublimation or condensation process, the tubular members 3 are internally cooled by introducing a cooling fluid via the supply 3*a*, 3*b* into a dividing element 19*a*, 19*b*, (19*d*,) which takes care of the supply of the various inner members 18 with cooling fluid, for instance liquid ammonia. The cooling fluid is fed into the inner member 18 via the supply 3*a*. The cooling fluid rises through the inner member 18 and spills into the outer member 2 at the upper end 18B of the inner member 18. In this example, the cooling fluid runs down the inner surface of the outer member 2 as a falling film of cooling fluid. Hence, the cooling fluid cools the outer member 2. Also, a liquid of a temperature comparable to that of the cooling fluid (for instance −28° C.), and having a freezing point lower than the evaporation temperature of the cooling fluid, is supplied via the inlet 8 to the distribution element 9, which, through spraying, takes care of the provision of a liquid film on the outer surface of the tubular members 3.

If the apparatus 100 is used in a oil deodorization process, the strip steam enters the chamber 1 via the inlet 1a. The strip steam passes an entrance area 5 of the chamber 1 and distributes in the area between the tubular members 3.

The strip steam desublimes or condenses on the liquid film on the outer surface of the tubular members 3 and is dissolved or mixed therein. The combined liquid and strip steam dissolved or mixed therein is herein also referred to as liquid-strip steam mixture. The liquid-strip steam mixture flows down along the tubular members 3. In the examples, the strip steam enters the chamber 1 from the top, while the supply 3a, 3b and the discharge 4 of the tubular members 3 is positioned at the bottom. This provides the advantage that the piping or other means for supplying the cooling fluid to and discharging the cooling fluid from the tubular members 3 does not form a flow resistance to the strip steam entering the space between the tubular members 3.

The downward flow of the liquid-strip steam mixture is not hindered by the baffle plates 20, since these surround the tubes at a distance. Nevertheless, the baffle plates 20 do ensure that the strip steam is intensively contacted with the liquid film on the tubular members 3, so that a desublimation or condensation of the strip steam on the tubular members 3 is as complete as possible.

Having arrived at the tube plate 1b, the liquid-strip steam mixture is extracted via the outlet 6 and introduced into the tank 11 where the aqueous phase of the strip steam dissolved in the liquid is removed from the liquid via the discharge 13 and fats are removed from the liquid via the discharge 14, while the liquid can be recycled via the discharge 12 and the pump 10 to the inlet 8 of the chamber 1 for reuse.

Separating the fats can be carried out in any suitable manner, for instance by making use of a difference in mass density between the various components. One option to be considered here is the so-called skimming when the fats float on the liquid. The separation of the aqueous phase from the condensed strip steam can likewise be done in various ways, for instance through, filtration techniques, such as reversed osmosis or ultrafiltration, through evaporation, as known in desalination plants and purification techniques, or by crystallization, for instance through vacuum ice technique.

It will be clear from the above description that the wet condensing process discussed makes a continuous process operation possible. If intermittent operation is sufficient, this is equally possible with the described apparatus, whilst maintaining its relatively light construction. In that case, it is possible to avoid the supply of liquid and the provision of a liquid film on the outer surface of the tubular members and to work according to a dry condensing process. Accordingly, the strip steam supplied will then desublime or condense and freeze onto the outer surface of the deep-cooled tubular members. Growth of an ice layer on the tubes, however, progressively diminishes the efficiency of the process. Therefore, from time to time, the process must be stopped and the ice formed must be thawed. Thereto, inlet 1A and outlet 7 are closed and a warm or hot fluid, such as hot water can be supplied to the ice on the outer surface of the tubular members via the distribution element 9. After this treatment, and optionally cleaning the tubular members of adherent fatty components coming from the strip steam, the chamber is to be brought to the desired low pressure and temperature before the desublimation or condensation process can be started again. Hence, is provided a process in which the steps of condensing or desubliming; heating the tubular members for thawing the ice; cooling down the tubular members; are performed repetitively. Since in this process the chamber and the tubular members must be cooled and heated regularly, the substantial insensitivity of the apparatus to shrinkage and expansion forces is particularly advantageous.

During the step of condensing or desubliming the strip steam the tubular members are continuously cooled. Thereto the cooling fluid, here liquid Ammonia at a temperature of e.g. −25 to −35° C., is provided to the supply 3a, 3b flows through the inner member 18 and the outer member, consecutively. In this example, the liquid cooling fluid flows through the inner member 18 at a flow speed of approximately 1 to 2 m/s. The cooling fluid is provided by a cooling system 102, see FIG. 6.

Figure 6:
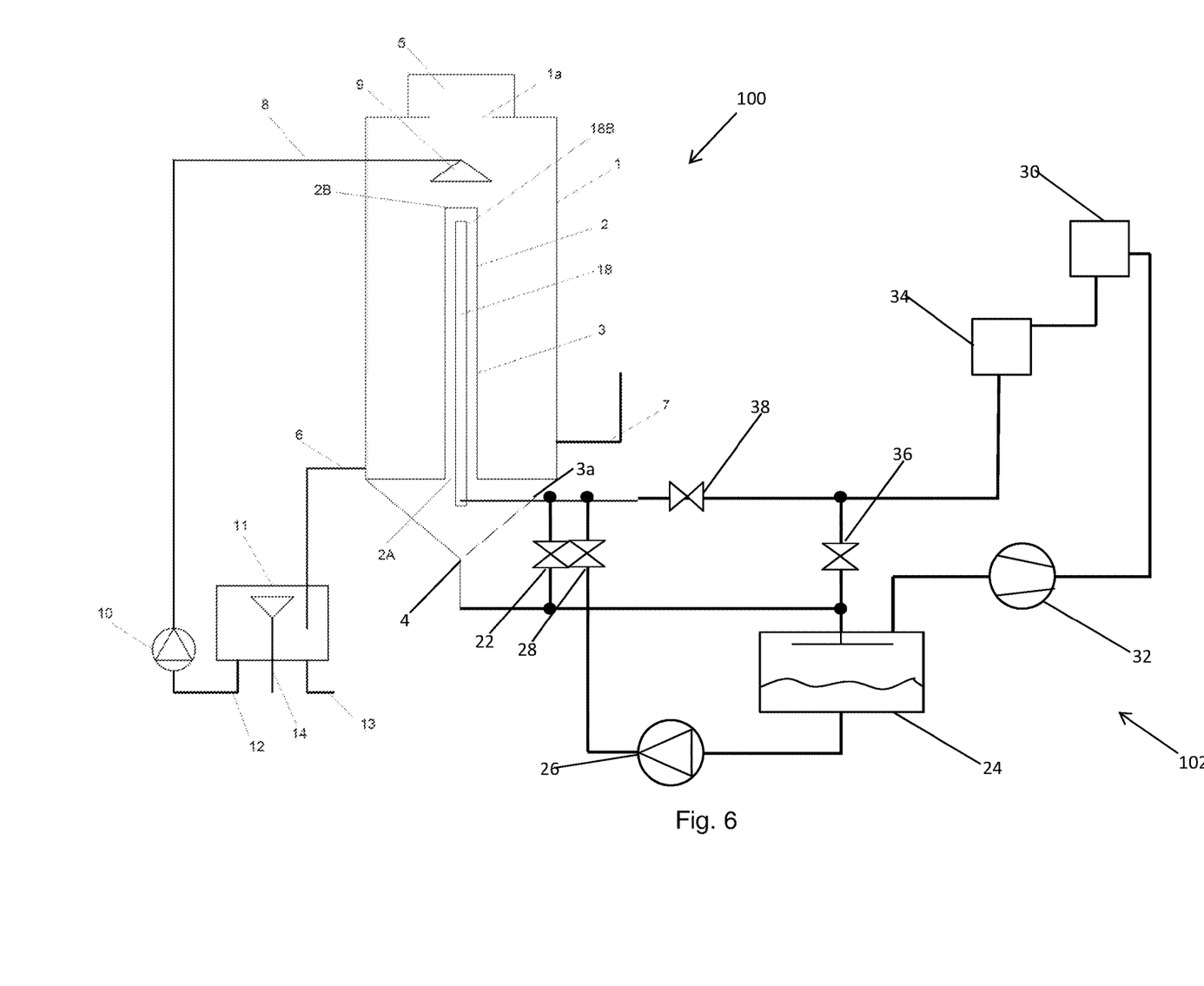
FIG. 6 shows a schematic view of an apparatus according to the invention.

The cooling system 102 includes a first reservoir 24 containing the liquid cooling fluid. In this example, the first reservoir 24 contains liquid ammonia of approximately −30° C. at approximately 1 bar. During the step of condensing of desubliming the liquid cooling fluid is pumped to the supply 3a, 3b by a pump 26 via a valve 28. After passing through the tubular members 3, the cooling fluid returns via the discharge 4 to the first reservoir 24. The returned cooling fluid will be heated during its passage through the tubular members 3. As a result, the first reservoir 24 will contain a gas head. This gas head is pumped to a condensor 30 by means of a compressor 32. In the condensor 30 the gaseous cooling fluid is liquified. The liquid cooling fluid is gathered in a second reservoir 34. In this example the second reservoir 34 contains liquid ammonia of approximately 25° C. at approximately 15 bar. Preferably the high pressure hot cooling fluid in the second reservoir 34 is a superheated liquid. This high pressure liquid cooling fluid is fed back to the first reservoir 24, in this example via a valve 36. In the first reservoir 24 the high pressure liquid cooling fluid expands to the cooled liquid cooling fluid at low pressure.

At the end of the step of condensing or desubliming, the supply of liquid cooling fluid to the supply 3a, 3b is stopped. The liquid cooling fluid present in the interstice between the outer member 2 and the inner member 18 flows out through the discharge 4 under the influence of gravity. The liquid cooling fluid present in the inner member 18 can flow out under the influence of gravity by opening the valve 22, 22a. When the liquid cooling fluid is drained from the apparatus 100, the step of heating can be started.

The step of heating can include heating the tubular members 3 to a temperature of between 20 to 100° C., for example between 60 and 80° C. Thereto a heating liquid such as hot water of such temperature can be provided to the inlet 8. The heating liquid is provided to the outside of the outer members 2. Thereby the tubular members 3 are heated and any ice is thawed off the tubular members. At the end of the heating step the heating liquid is drained from the apparatus 100 via the outlet 6.

During the cooling down step the tubular members 3 can be cooled back from the heated temperature, of e.g. 60-80° C., to an operating temperature, of e.g. −25 to −35° C. The cooling back is preferably performed gradually, for instance during a time span of 20 to 60 minutes. Thus, cooling can be effected with an apparatus for cooling the cooling fluid, the apparatus having a reduced capacity.

During the cooling step a two phase mixture of the cooling fluid is provided to the tubular members 3. The two phase mixture includes a gas phase and a liquid phase. The two phase mixture can be a mixture of liquid and gaseous ammonia. In this example the two phase mixture is obtained by providing the high pressure liquid cooling fluid from the second reservoir 34 to the supply 3a, 3b. In this example, thereto a valve 38 is provided providing a direct fluid connection for the high pressure liquid cooling fluid from the second reservoir 34 to the supply 3a, 3b. The high pressure liquid cooling fluid in this example expands at the inlet, e.g. at a restriction at or near the supply, e.g. formed by valve 3a, 3b, at the supply. Thereby part of the high pressure liquid cooling fluid evaporates to gas phase, while another part of the high pressure liquid cooling fluid forms droplets. Hence a cooled mist of cooling fluid is obtained. In this example an ammonia mist of approximately −30° C.

The two phase mixture flows into the tubular members 3. The liquid phase of the two phase mixture evaporates and thereby cools the tubular members. In this example, the two phase mixture of the cooling fluid is provided to the tubular members 3 intermittently during the cooling step. Hence, during the cooling step first periods of providing the two phase mixture to the tubular members alternate with second periods of not providing a cooling fluid to the tubular members. Preferably, a duration of such second period of not providing a cooling fluid to the tubular members is longer than the duration of such first period of providing the two phase mixture to the tubular members. Preferably the second period is more than two times longer than the first period. For example the second period is three to ten times longer than the first period. For example the first period is ten to fifteen seconds. For example the second period is fifty to one hundred seconds. It will be appreciated that switching between providing the two phase mixture to the tubular members and not providing a cooling fluid to the tubular members can be performed by means of the valve 38.

Preferably, the two phase mixture is provided to the tubular members such that evaporation of the liquid phase takes place in the space between the outer member 2 and the inner member 18. Preferably evaporation of the liquid phase in, or upstream of, the inner member 18 is prevented or at least limited. Thereto the flow speed in and upstream of the inner member 18, i.e. upstream of the upper end 18B, or at least between the supply 3a, 3b and the upper end 18B, is maintained at a sufficiently high level. The high flow speed carries droplets of the cooling fluid to the upper end 18B. Also, the high flow speed can carry liquid cooling fluid that condensed on an inner side of the inner member 18 to the upper end 18B. Preferably the flow speed of the two phase mixture in, and upstream of, the inner member 18 is at least 10 m/s. It will be appreciated that the construction can be designed so as to achieve the desired flow speed. Typically diameters of piping upstream of the upper end 18B, e.g. between the supply 3a and the upper end 18B is chosen between 4 to 10 mm, preferably approximately 6 mm.

The outer members 2 have a larger diameter than the inner members 18. In an embodiment the outer members 2 have a diameter of at least 50 mm. A center-to-center distance between to adjacent tubular members 3 is preferably two to three times the diameter of the outer member 2. It has been found that such distance provides several advantages. At a smaller distance pressure losses in the chamber 1 may increase due to a sensitivity to laminar flow losses caused by a decrease in hydraulic diameter. Also, at smaller distances the number of tubular members per unit area increases, increasing cost price of the apparatus 100. When using ammonia as two phase cooling fluid, it is preferred that the construction containing mainly the gaseous ammonia, i.e. the outer tubular members 2 and the collecting chamber 19c are designed to withstand a pressure of at least 17 bars in excess of ambient pressure surrounding the apparatus 100. The step of cooling down can be performed until the apparatus 100 is at its desired working temperature.

When the apparatus 100 is cooled down, a next step oof condensing or desubliming can be started. It is noted that during the step of condensing or desubliming the strip steam the cooling fluid is preferably supplied to the tubular members as a one phase fluid, in this example a liquid. Thereto the valve 38 can be closed and the valve 28 can be opened. The cooling fluid can then have a temperature of −25 to −35° C. The cooling fluid can be liquid ammonia.

In an embodiment of a system for condensing or desubliming strip steam according to the dry condensing process, the system includes two apparatus 100 as described above. Such system is preferred if the strip steam is provided continuously, e.g. from a continuous oil deodorisation process. In that case at any moment one apparatus 100 can be in the process of condensing or desubliming strip steam, while the other apparatus 100 performs the step of heating or the step of cooling, or optionally is being cleaned.

As described above, the downward flow of liquid is not hindered by the baffle plates 20, since these surround the tubes at a distance. Preferably a diameter of a hole in the baffle plate is approximately 10 to 20 mm larger than an outer diameter of the outer member 2. The tubular members 3 are preferably free from contact with the baffle plates over the entire length of the tubular member. Hence, also the heating liquid provided to the inlet 8 is not hindered by the baffle plates when flowing down the tubular members 3 for thawing.

It will be appreciated that in the examples the heating liquid and the cooling fluid flow out of the chamber 1 due to gravity when supply of the heating liquid and cooling fluid is stopped. It will be appreciated that thereto the relevant valves may need to be opened. This provides the advantage that the heating liquid and cooling fluid can very easily be drained from the apparatus, e.g. for maintenance.

In the foregoing, the invention has been described with reference to specific examples of embodiments of the invention. It will, however, be evident that various modifications and changes may be made therein, without departing from the essence of the invention. For the purpose of clarity and a concise description features are described herein as part of the same or separate embodiments, however, alternative embodiments having combinations of all or some of the features described in these separate embodiments are also envisaged.

It is possible that the tube plate 1b is dismountably arranged in the chamber, affording the possibility of relatively easily removing of the tubular members from the chamber for inspection, maintenance or replacement. Further, the tubular members could all terminate within the chamber in a joint outlet, so that the tube plate only needs to have a single passage. Also, the tubular members could terminate in the tube plate 1b with an end open towards the outside, while on the chamber there is mounted a collecting vessel, closed to the surroundings, for collecting and discharging the cooling fluid.

Although the apparatus according to the invention has been described with reference to a process for processing strip steam, it will be clear that this exemplary embodiment is not intended to limit the invention to that specific area of the art, but that the invention is equally advantageous for any fluids that need to be desublimed or condensed. It will be appreciated that the apparatus 100 according to the invention can also be operated for evaporating a liquid. In that case the tubular members 3 are supplied with a heating fluid rather than with a cooling fluid. The heating fluid can for instance be hot water. The to-be-evaporated liquid can be supplied to the outer surface of the tubular members, e.g. using the distribution element 9 or a similar device. The inlet 1a can then act as an exhaust for the evaporate. The apparatus can for instance be used for reducing the water content of a dairy product such as milk by evaporation of the water fraction. The apparatus according to the invention provides the advantage that it is easy to clean, so it is particularly advantageous in applications that put high constraints on hygiene.

In the examples is referred to ammonia as cooling fluid. It will be appreciated that other cooling fluids may also be used.

However, other modifications, variations, and alternatives are also possible. The specifications, drawings and examples are, accordingly, to be regarded in an illustrative sense rather than in a restrictive sense.

For the purpose of clarity and a concise description features are described herein as part of the same or separate embodiments, however, it will be appreciated that the scope of the invention may include embodiments having combinations of all or some of the features described.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A method for desubliming or condensing a water-containing strip steam, in an apparatus provided with a chamber and at least one tubular member extending in an upright direction within the chamber and having a falling film of liquid ammonia at a temperature of −25 to −35° C. as cooling fluid on an inner side thereof,
    wherein the at least one tubular member is provided with an outer member and an inner member extending within the outer member, wherein the inner member at a first end thereof is in communication with a supply of the cooling fluid and the outer member at a first end thereof is in communication with a discharge for the cooling fluid, wherein the outer member at a second end thereof is closed, and the inner member at a second end thereof is open and mouths into the outer member,
    wherein the method includes, repetitively performing, in this order, the steps of
        a) condensing or desubliming the water-containing strip steam at a working temperature of the at least one tubular member;
        b) thawing off ice by heating the at least one tubular member to a higher temperature than the working temperature; and
        c) cooling down the at least one tubular member from the higher temperature to the working temperature;
    wherein the step a) includes supplying the cooling fluid through the inner member as a one phase liquid at a first flow speed so as to provide the falling film of liquid ammonia on an inner side of the outer member, and
    desubliming or condensing the water-containing strip steam on an outer surface at the at least one tubular member;
    wherein the step c) includes providing the cooling fluid as a two phase mixture to an entrance of the inner member of the at least one tubular member via a restriction at a second flow speed, which is higher than the first flow speed, and having a liquid phase of the two phase mixture of the cooling fluid evaporate downstream of the second end of the inner member.

2. The method of claim 1, including maintaining the second flow speed of the two phase mixture of the cooling fluid between the supply and the second end of the inner member at a high level, wherein the high level is at least 10 m/s.

3. The method of claim 1, including cooling down of the apparatus from the higher temperature to the working temperature by intermittently providing the two phase mixture to the at least one tubular member.

4. The method of claim 3, including alternately during a first period providing the two phase mixture to the at least one tubular member and during a second period not providing the cooling fluid to the at least one tubular member, wherein a duration of such second period is longer than the duration of such first period.

5. The method of claim 1, wherein the water-containing strip steam originates from a device for refining oil.

6. The method of claim 1, wherein the at least one tubular member includes a plurality of tubular members which are accommodated upright and mutually parallel in the chamber, such that the cooling fluid present in the at least one tubular member can flow out under the influence of gravity when supply of the cooling fluid is stopped.

7. The method of claim 1, wherein at least at one level between the second end and the first end of the outer member a baffle plate is arranged over a part of the chamber, in which the baffle plate is provided with a passage for the outer member in which the passage is dimensioned such that there is a distance between the baffle plate and an outer surface of the outer member, such that the outer member is free from contact with the baffle plate.

8. The method of claim 1, wherein the first end of the inner member is a lower end of the inner member, the first end of the outer member is a lower end of the outer member, a second end of the inner member is an upper end of the inner member, and a second end of the outer member is an upper end of the outer member.

9. A method for treating an oil, including
    removing fatty acids, coloured and/or malodorous components and/or other volatile substances from the oil by stripping said oil with a water-containing strip steam, and
    desubliming or condensing the water-containing strip steam in an apparatus provided with a chamber and at least one tubular member extending in an upright direction within the chamber and having a falling film of cooling fluid on an inner side thereof,
    wherein the at least one tubular member is provided with an outer member and an inner member extending within the outer member, wherein the inner member at a first end thereof is in communication with a supply of the cooling fluid and the outer member at a first end thereof is in communication with a discharge for the cooling fluid, wherein the outer member at a second end thereof is closed, and the inner member at a second end thereof is open and mouths into the outer member,
    wherein the method includes, repetitively performing, in this order, the steps of
        a) condensing or desubliming the water-containing strip steam at a working temperature of the at least one tubular member;
        b) thawing off ice by heating the at least one tubular member to a higher temperature higher than the working temperature; and c) cooling down the at least one tubular member from the higher temperature to the working temperature;

wherein the step a) includes supplying the cooling fluid through the inner member as a one phase liquid at a first flow speed so as to provide the falling film of the cooling fluid on an inner side of the outer member and desubliming or condensing the water-containing strip steam on an outer surface at the at least one tubular member;

wherein the step c) includes providing the cooling fluid as a two phase mixture to an entrance of the inner member of the at least one tubular member via a restriction at a second flow speed, which is higher than the first flow speed, and having a liquid phase of the two phase mixture of the cooling fluid evaporate downstream of the second end of the inner member.

* * * * *